United States Patent
Takahashi et al.

(10) Patent No.: US 12,351,211 B2
(45) Date of Patent: Jul. 8, 2025

(54) MOVEMENT CONTROL SYSTEM AND MOVING OBJECT

(71) Applicant: HONDA MOTOR CO., LTD., Tokyo (JP)

(72) Inventors: Teruki Takahashi, Tokyo (JP); Makoto Nakatsuka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 503 days.

(21) Appl. No.: 17/666,043

(22) Filed: Feb. 7, 2022

(65) Prior Publication Data

US 2022/0289242 A1 Sep. 15, 2022

(30) Foreign Application Priority Data

Mar. 12, 2021 (JP) ................................. 2021-040632

(51) Int. Cl.
*B60W 60/00* (2020.01)

(52) U.S. Cl.
CPC ..... *B60W 60/0015* (2020.02); *B60W 2556/45* (2020.02)

(58) Field of Classification Search
None
See application file for complete search history.

(56) References Cited

U.S. PATENT DOCUMENTS

| | | | | |
|---|---|---|---|---|
| 2018/0160081 A1* | 6/2018 | Ren | ...................... | G05D 1/0094 |
| 2018/0164804 A1* | 6/2018 | Hou | ...................... | G05D 1/0038 |
| 2018/0231977 A1 | 8/2018 | Uno | | |
| 2019/0344799 A1* | 11/2019 | Tiwari | ................ | B60W 50/029 |
| 2020/0189600 A1* | 6/2020 | Tsuji | .................. | B60W 60/0011 |
| 2021/0009148 A1* | 1/2021 | Oguro | ................. | B60W 30/146 |
| 2021/0009156 A1* | 1/2021 | Hu | .......................... | G06V 20/56 |
| 2021/0080951 A1 | 3/2021 | Uno | | |
| 2022/0179414 A1 | 6/2022 | Uno | | |
| 2022/0242447 A1* | 8/2022 | Nagura | ............ | B60W 50/0098 |

(Continued)

FOREIGN PATENT DOCUMENTS

| | | | |
|---|---|---|---|
| CN | 105872371 A | 8/2016 | |
| CN | 108023937 A | 5/2018 | |

(Continued)

OTHER PUBLICATIONS

May 12, 2025, translation of Chinese Office Action issued for related CN Application no. 202210164582.1.

*Primary Examiner* — David P. Merlino
(74) *Attorney, Agent, or Firm* — Paratus Law Group, PLLC

(57) ABSTRACT

A movement control system includes: a server; and a moving object configured to perform first automatic movement control in which control contents are determined based on outside information and second automatic movement control in which the control contents are given by the server receiving the outside information. The moving object performs the second automatic movement control in a case where both the first automatic movement control and the second automatic movement control are performable. The moving object does not perform the second automatic movement control in a case where the second automatic movement control is performable but the first automatic movement control is unperformable.

4 Claims, 4 Drawing Sheets

(56) References Cited

U.S. PATENT DOCUMENTS

| | | |
|---|---|---|
| 2023/0100568 A1 | 3/2023 | Uno |
| 2023/0132470 A1 | 5/2023 | Tsuji |
| 2024/0001930 A1 | 1/2024 | Hu et al. |

FOREIGN PATENT DOCUMENTS

| | | |
|---|---|---|
| CN | 108447289 A | 8/2018 |
| CN | 110893858 A | 3/2020 |
| CN | 111391829 A | 7/2020 |
| CN | 112208538 A | 1/2021 |

* cited by examiner

MOVEMENT CONTROL SYSTEM AND MOVING OBJECT

CROSS-REFERENCE TO RELATED APPLICATIONS

This application is based on and claims priority under 35 USC 119 from Japanese Patent Application No. 2021-040632, filed on Mar. 12, 2021, the contents of which are incorporated herein by reference.

TECHNICAL FIELD

The present disclosure relates to a movement control system and a moving object.

BACKGROUND ART

There is a vehicle control system configured to perform automatic movement control in which outside information detected by a moving object, such as a vehicle, is transmitted to a server and control instructions are transmitted from the server to the moving object (for example, see JP2018-132985A).

For example, when a failure occurs in communication between the server and the moving object during execution of second automatic movement control that is mediated by the server, the automatic movement control can be continued by shifting to first automatic movement control that is not mediated by the server and thus can be executed without being affected even when the failure occurs in the communication between the server and the moving object. However, if the first automatic movement control cannot be executed, it is not possible to shift to the first automatic movement control and the automatic movement control is suddenly stopped, which is not preferable in terms of safety.

JP2018-132985A discloses a vehicle communication system configured to execute system-led control in a communication establishment section and driver-led control in a communication interruption section but does not disclose how safety is ensured when the failure occurs in the communication between the server and the moving object.

SUMMARY

An object of the present disclosure is to provide a movement control system and a moving object that can improve safety when a failure occurs in communication between a server and the moving object.

According to an aspect of a present disclosure, a movement control system includes:
a server; and
a moving object configured to perform first automatic movement control in which control contents are determined based on outside information and second automatic movement control in which the control contents are given by the server receiving the outside information, in which
the moving object performs the second automatic movement control in a case where both the first automatic movement control and the second automatic movement control are performable, and
the moving object does not perform the second automatic movement control in a case where the second automatic movement control is performable but the first automatic movement control is unperformable.

According to another aspect of a present disclosure, a moving object configured to perform automatic movement control, the moving object includes:
a communication unit configured to communicate with a server;
an acquisition unit configured to acquire outside information about the moving object, and
a control unit configured to execute first automatic movement control in which control contents are determined based on the outside information and second automatic movement control in which the control contents are given by the server receiving the outside information from the communication unit, in which
the control unit executes the second automatic movement control in a case where both the first automatic movement control and the second automatic movement control are performable, and
the control unit does not execute the second automatic movement control in a case where the second automatic movement control is performable but the first automatic movement control is unperformable.

According to another aspect of a present disclosure, a control method for a moving object configured to perform first automatic movement control in which control contents are determined based on outside information and second automatic movement control in which the control contents are given by a server receiving the outside information, the control method includes:
executing the second automatic movement control in a case where both the first automatic movement control and the second automatic movement control are performable; and
not executing the second automatic movement control in a case where the second automatic movement control is performable but the first automatic movement control is unperformable.

According to the movement control system and the moving object of the present disclosure, safety when a failure occurs in communication between a server and the moving object can be improved.

BRIEF DESCRIPTION OF DRAWINGS

Exemplary embodiments of the present disclosure will be described in detail based on the following figures, wherein.

DESCRIPTION OF EMBODIMENTS

In the following, an embodiment of a movement control system a moving object according to the present disclosure will be described with reference to the drawings. An example in which a vehicle M, such as an automobile, is used as a moving object according to the present disclosure will be described.

Figure 1:
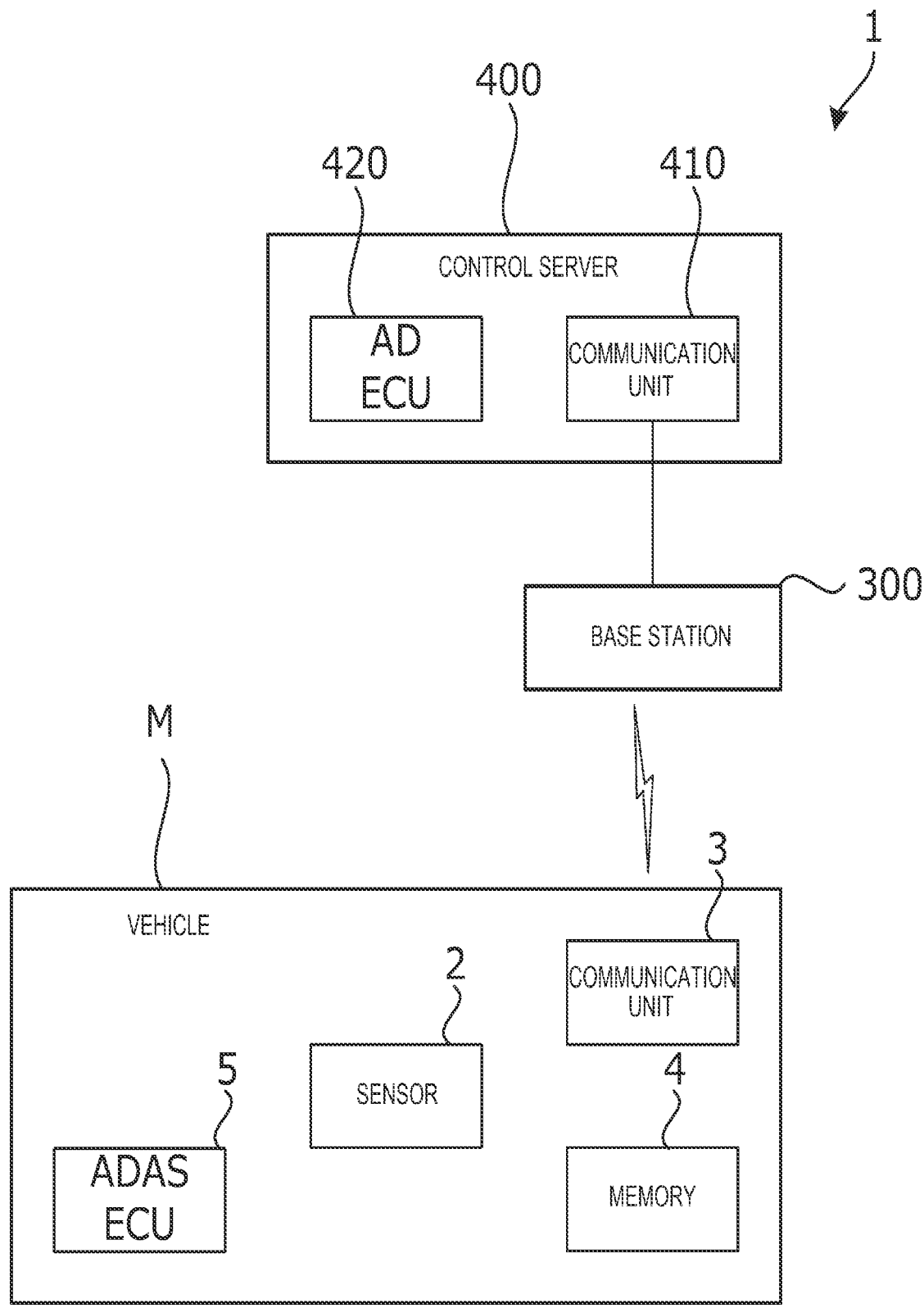
FIG. 1 shows an example of a movement control system according to the present embodiment.

A movement control system 1 of the present embodiment will be described with reference to FIG. 1. As shown in FIG. 1, the movement control system 1 includes: the vehicle M;

and base stations 300 and a control server 400 that are communicably connected to the vehicle M.

The vehicle M is configured to move automatically based on automatic movement control. The vehicle M includes: a sensor 2 configured to acquire outside information around the vehicle M; and a communication unit 3 for communicating with the base stations 300. The vehicle M further includes: a memory 4 for storing vehicle information (including the outside information acquired by the sensor 2) about the vehicle M; and an advanced driver-assistance systems electronic control unit (ADAS ECU) 5 configured to manage operation of the vehicle M. The ADAS ECU 5 is configured to derive control contents of the automatic movement control on the vehicle M, for example, from the outside information acquired by the sensor 2.

The base stations 300 are installed at predetermined intervals to realize widespread communication with the vehicle M. Each of the base stations 300 includes antennae. Each of the antennae may have different performance. The base stations 300 are wirelessly connected to the vehicle M to communicate with the vehicle M.

The control server 400 includes: a communication unit 410; and an automated driving electronic control unit (AD ECU) 420. The control server 400 is installed, for example, in a facility, such as a management station. The communication unit 410 is communicably connected to the base stations 300 via a wired or wireless communication network. In addition, the communication unit 410 is communicably connected to the vehicle M via the base stations 300. The AD ECU 420 is configured to derive the control contents of the automatic movement control on the vehicle M, for example, from the outside information received from the vehicle M in communication with the vehicle M. The AD ECU 420 is configured to transmit the derived control contents of the automatic movement control on the vehicle M to the vehicle M via the base stations 300.

A method of wireless communication between the vehicle M and the base stations 300 is, for example, a communication method that is used by a mobile phone, a smartphone, or the like and that permits a relatively wide range of movement. The method of the wireless communication is, for example, a third generation mobile communication standard (hereinafter referred to as "3G"), a fourth generation mobile communication standard (hereinafter referred to as "4G"), a fifth generation mobile communication standard (hereinafter referred to as "5G"), and a sixth generation mobile communication standard (hereinafter referred to as "6G"). The mobile communication standards enable high-speed communication as the generation advances, that is, as the number increases from "3G" to "6G". Various base stations 300 corresponding to electromagnetic waves of 3G to 6G are installed in each of the places in which the vehicle M travels.

Based on strength (communication conditions) of an electromagnetic wave that can be received, the vehicle M is configured to designate one of the base stations 300 (for example, a 3G base station, a 4G base station, a 5G base station, or a 6G base station) as a partner with which the communication unit 3 of the vehicle M communicates. The one of the base stations 300, which is the communication partner, changes according to a location of the vehicle M. For example, the vehicle M constantly measures strength of an electromagnetic wave of a neighboring base station 300 and, when strength of the electromagnetic wave becomes equal to or less than a certain value, severs the communication with the base station 300 to switch to another base station 300 whose electromagnetic wave has greater strength.

The vehicle M is configured to perform "first automatic movement control" in which the automatic movement is performed based on control by the vehicle M itself and "second automatic movement control" in which the automatic movement is performed based on control by the control server 400. In the first automatic movement control, the vehicle M performs the automatic movement of the vehicle M based on the control contents of the automatic movement derived by the vehicle M itself. The vehicle M is configured to derive the control contents of the automatic movement based on the outside information about the vehicle M acquired by the sensor 2.

In the second automatic movement control, the vehicle M performs the automatic movement of the vehicle M based on the control contents of the automatic movement derived by the control server 400. The control server 400 derives the control contents of the automatic movement based on the outside information about the vehicle M transmitted from the vehicle M. In the vehicle M, the ADAS ECU 5 executes the control contents of the first automatic movement control derived by the vehicle M and the control contents of the second automatic movement control derived by the control server 400.

The second automatic movement control in which the control contents of the automatic movement derived by the control server 400 is executed is a driving method having a higher degree of automation for the control on the vehicle than the first automatic movement control in which the control contents of the automatic movement derived by the vehicle M itself is executed. High degree of automation means that, for example, a degree is low to which the vehicle is controlled based on driver's (user's) operation onto the vehicle M, that is, the number of tasks, such as monitoring surroundings of the vehicle M, required to be performed by the driver is small.

The second automatic movement control is an automatic movement control method in which the driver does not need to monitor the surroundings of the vehicle M or to operate a steering wheel. The second automatic movement control method is, for example, a control method in which the vehicle M can automatically control a speed and steering with the driver not handling (for example, neither gripping, holding, nor touching) the steering wheel and not monitoring the surroundings of the vehicle.

The first automatic movement control is an automatic movement control method in which the driver needs to monitor the surroundings of the vehicle M but the driver does not need to operate the steering wheel. The first automatic movement control method is, for example, a control method in which the vehicle M can automatically control a speed and the steering with the driver monitoring the surroundings of the vehicle M but not operating the steering wheel.

The first automatic movement control method may be, for example, an automatic movement control method in which the driver needs, at least, to monitor the surroundings (to look forward) for safe driving. The first automatic movement control method may be, for example, a control method in which the vehicle M can automatically control a speed and the steering with the driver operating the steering wheel and monitoring the surroundings of the vehicle M. In the first automatic movement control method, ADAS may be activated. ADAS are represented by an adaptive cruise control system (ACC) or a lane keeping assist system (LKAS).

For example, the vehicle M may be configured to execute "manual movement control" in which the driver performs manual driving.

The above conditions under which the first and second automatic movement control is performed are examples and may be modified arbitrarily as long as the second automatic movement control method has higher degree of automation in the vehicle M than the first automatic movement control method, that is, the number of the driver's tasks is smaller in the second automatic movement control than in the first automatic movement control. For example, either or both of the first and second automatic movement control may relate to automated driving or driving support instead.

Figure 2:
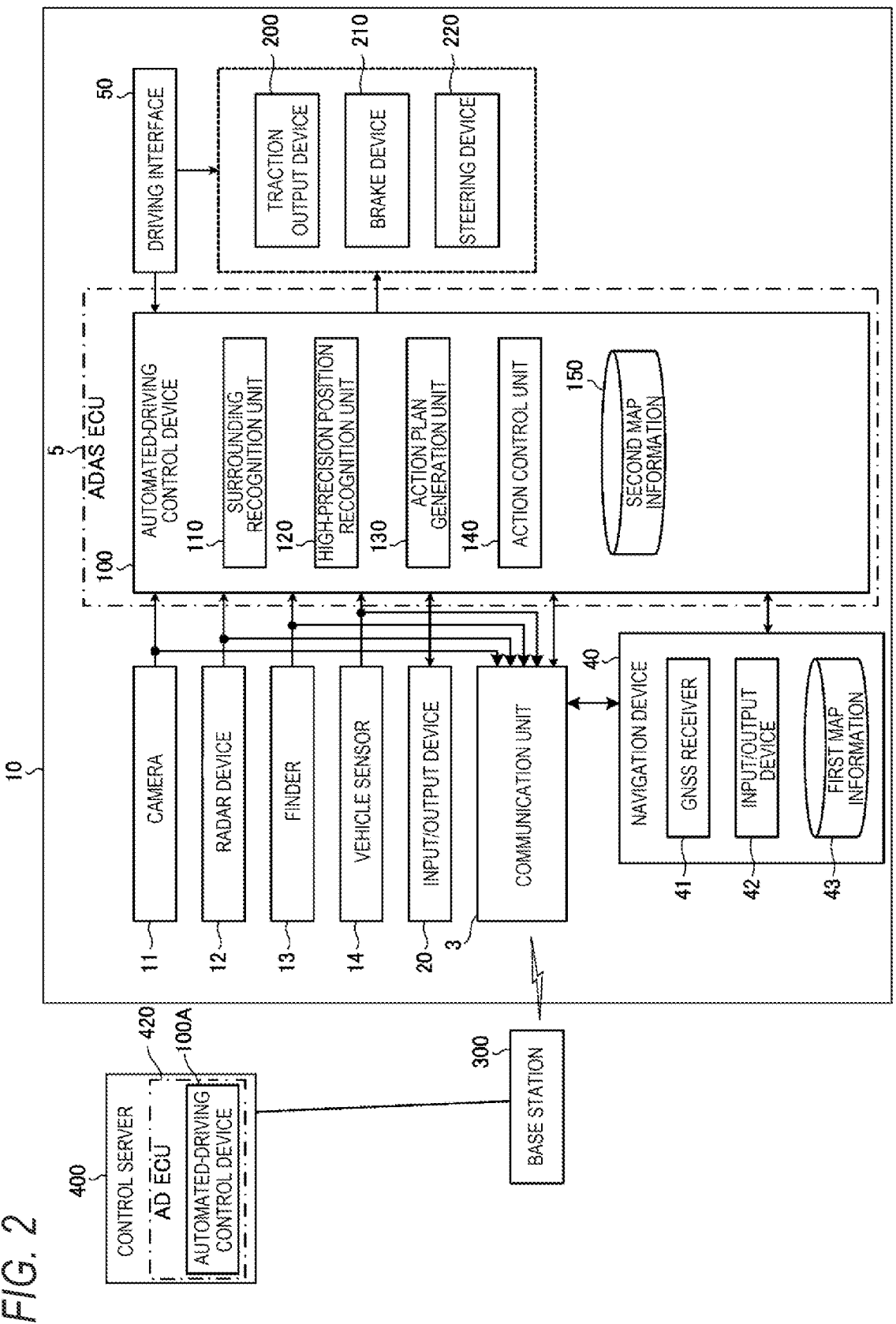
FIG. 2 is a block diagram showing a configuration of a vehicle system mounted on a vehicle (moving object) according to the present embodiment.

Next, a vehicle system 10 mounted on the vehicle M will be described with reference to FIG. 2. As shown in FIG. 2, the vehicle system 10 includes: a camera 11; a radar device 12; a finder 13; a vehicle sensor 14; an input/output device 20; the communication unit 3; a navigation device 40; a driving interface 50; an automated-driving control device 100; a traction output device 200; a brake device 210; and a steering device 220. These devices are communicably connected to each other via a wired or wireless communication network. The communication network connecting these devices is, for example, a controller area network (CAN).

The camera 11, the radar device 12, the finder 13, and the vehicle sensor 14 are included in the sensor 2 shown in FIG. 1. The camera 11, the radar device 12, the finder 13, and the vehicle sensor 14 is configured to acquire the outside information around the vehicle M.

The camera 11 is a digital camera configured to shoot the surroundings (for example, a region in front) of the vehicle M to output obtained image data to the automated-driving control device 100 and the communication unit 3. The radar device 12 uses, for example, a millimeter wave to acquire a position of an object around (for example, in front of, behind, and on sides of) the vehicle M and outputs an obtained result to the automated-driving control device 100 and the communication unit 3. The finder 13 is, for example, a laser imaging detection and ranging (LIDAR) configured to measure a distance to the object (target) around (for example, in front of, behind, and on the sides of) the vehicle M using predetermined laser light and to output an obtained result to the automated-driving control device 100 and the communication unit 3.

The vehicle sensor 14 includes, for example: a vehicle speed sensor configured to measure a speed of the vehicle M; an accelerometer configured to measure acceleration of the vehicle M; a gyroscope configured to measure angular velocity around a vertical axis of the vehicle M; an orientation sensor configured to detect an orientation of the vehicle M; and the like. The vehicle sensor 14 further includes an electromagnetic-wave strength indicator configured to measure strength of the electromagnetic wave (that is, communication conditions) used by the communication unit 3 for the communication. The vehicle sensor 14 is configured to output an obtained result of each of the sensors to the automated-driving control device 100 and the communication unit 3.

The input/output device 20 includes: an output device configured to provide various types of information for the user of the vehicle M (hereinafter, also simply referred to as the user); and an input device configured to receive various types of input operation from the user. In the present embodiment, the user is not limited to a person who manages or owns and uses the vehicle M. For example, the user may be a person who uses the vehicle M instead of the person who manages or owns the vehicle M.

The output device of the input/output device 20 is, for example, a display configured to display a processing result of the automated-driving control device 100 and an automated-driving control device 100A (to be described later) of the control server 400. The output device may be a speaker, a buzzer, an indicator, or the like. The input device of the input/output device 20 is, for example, a touch panel or a button (a key, a switch, or the like) configured to output an operation signal corresponding to input operation received from the user to the automated-driving control device 100 and the automated-driving control device 100A of the control server 400.

The navigation device 40 includes: a global navigation satellite system (GNSS) receiver 41; and an input/output device 42. The navigation device 40 further includes a storage device (not shown), such as a hard disk drive (hereinafter, also referred to as an HDD) and a flash memory, in which first map information 43 is stored. The first map information 43 is, for example, information indicating a road shape by a link representing a road and nodes connected by the link. Further, the first map information 43 may include information indicating a curvature of a road or a point of interest (POI).

The GNSS receiver 41 determines, based on a signal received from a GNSS satellite, a latitude and longitude of the vehicle M. Further, the navigation device 40 may determine or correct a location of the vehicle M by an inertial navigation system (INS) using an output of the vehicle sensor 14.

The input/output device 42 includes: an output device configured to provide various types of information for the user; and an input device configured to receive various types of input operation from the user. The output device of the input/output device 42 is, for example, a display configured to display a processing result (for example, a map route to be described later) of the navigation device 40. The input device of the input/output device 42 is, for example, a touch panel or a button (a key, a switch, or the like) configured to output an operation signal corresponding to input operation received from the user to the navigation device 40. The input/output device 42 and the input/output device 20 may be configured with the same device.

The navigation device 40 is configured to determine, by referring to the first map information 43, a route (hereinafter, also referred to as a map route), for example, from the position of the vehicle M acquired by the GNSS receiver 41 to a destination input by the user. The navigation device 40 guides the user along the determined map route using the input/output device 42. The navigation device 40 is configured to output information indicating the acquired position of the vehicle M and the determined map route to the automated-driving control device 100 and the communication unit 3.

The driving interface 50 includes various devices such as an accelerator pedal, a brake pedal, a gear shift, a steering wheel, an irregular steering wheel, and a joystick. The driving interface 50 is provided with a sensor configured to detect how much the driving interface 50 is being operated or whether the driving operator 50 is being operated. A detection result by the sensor of the driving interface 50 is output to some or all of the automated-driving control device 100, the communication unit 3, the traction output device 200, the brake device 210, and the steering device 220.

The traction output device 200 is configured to output traction (torque) to drive wheels for the vehicle M to travel. The traction output device 200 includes, for example: an electric motor; and an electric motor electric control unit (ECU) configured to control the electric motor. The electric motor ECU is configured to control the electric motor based on the detection result of the sensor of the driving interface 50 (for example, the accelerator pedal), control information from the automated-driving control device 100, and control information from the automated-driving control device 100A of the control server 400. If the vehicle M includes an internal combustion engine as a drive source and a transmission, the traction output device 200 may include: the internal combustion engine; the transmission; and an ECU configured to control the internal combustion engine and the transmission.

The brake device 210 includes, for example: a brake caliper; a cylinder for transmitting hydraulic pressure to the brake caliper; an electric motor configured to generate the hydraulic pressure in the cylinder; and a brake ECU. The brake ECU is configured to control the electric motor of the brake device 210 based on the detection result of the sensor of the driving interface 50 (for example, the brake pedal), the control information from the automated-driving control device 100, and the control information from the automated-driving control device 100A of the control server 400 such that brake torque is output to each wheel based on brake operation.

The steering device 220 includes, for example: a steering ECU; and an electric motor. The electric motor of the steering device 220 is configured to change a direction of the steered wheels by applying a force to, for example, a rack-and-pinion mechanism. The steering ECU is configured to drive the electric motor of the steering device 220 to change the direction (that is, a steering angle) of the steered wheels based on the detection result of the sensor of the driving interface 50 (for example, the steering wheel), the control information from the automated-driving control device 100, and the control information from the automated-driving control device 100A of the control server 400.

The communication unit 3 is configured to communicate with the base stations 300 wirelessly. The communication unit 3 is configured to communicate with the communication unit 410 of the control server 400 via the base stations 300. The communication unit 3 is configured to transmit the vehicle information including: the outside information around the vehicle M acquired by the camera 11, the radar device 12, the finder 13, and the vehicle sensor 14; position information and route information determined by the navigation device 40; operation information detected by the driving interface 50; and the like to the control server 400 via the base stations 300. The communication unit 3 may be configured with, for example, a telematic control unit (TCU) configured to perform bidirectional communication. In addition, the communication unit 3 may use, for example, a cellular network, a Wi-Fi (registered trademark) network, Bluetooth (registered trademark), dedicated short-range communications (DSRC), or the like.

The automated-driving control device 100 includes: a surrounding recognition unit 110; a high-precision position recognition unit 120; an action plan generation unit 130; and an action control unit 140. The automated-driving control device 100 further includes a storage device (not shown) configured with a flash memory that can be accessed by each of the functional units (for example, the high-precision position recognition unit 120) of the automated-driving control device 100. Second map information 150 is stored in the storage device. The storage device may be the memory 4 shown in FIG. 1.

The surrounding recognition unit 110 is configured to perform sensor fusion processing on information acquired by some or all of the camera 11, the radar device 12, and the finder 13 to recognize an object around the vehicle M and to acquire the position of the object. The surrounding recognition unit 110 is configured to recognize, for example, an obstacle, a road shape, a traffic light, a guardrail, a utility pole, a surrounding vehicle (including a travelling state, such as a speed and acceleration, or a parking state), a lane marking, a pedestrian, and the like and to recognize positions thereof.

The high-precision position recognition unit 120 is configured to recognize the detailed position and a detailed orientation of the vehicle M by referring to the position of the vehicle M acquired by the navigation device 40, the detection result of the vehicle sensor 14, the image acquired by the camera 11, the second map information 150, and the like. For example, the high-precision position recognition unit 120 is configured to recognize a lane along which the vehicle M is travelling or a relative position and a relative orientation of the vehicle M with respect to the lane.

The action plan generation unit 130 is configured to generate an action plan of the vehicle M. Specifically, the action plan generation unit 130 is configured to generate a target trajectory along which the vehicle M will travel as the action plan of the vehicle M. The target trajectory is, for example, information expressed by points (trajectory points) to be arrived by the vehicle M arranged at an interval of a predetermined distance (for example, several meters). The target trajectory may include information about a speed, such as a target speed or target acceleration of the vehicle M for each predetermined time or for each trajectory point.

The action control unit 140 is configured to control the vehicle M such that the vehicle M acts in accordance with the action plan generated by the action plan generation unit 130. Specifically, the action control unit 140 is configured to control the traction output device 200, the brake device 210, and the steering device 220 such that the vehicle M travels along the target trajectory generated by the action plan generation unit 130 on time. For example, the action control unit 140 is configured to control the traction output device 200 and the brake device 210 based on the information about a speed associated with the target trajectory and to control the steering device 220 based on a curvature of the target trajectory.

The second map information 150 is precise more highly than the first map information 43. The second map information 150 includes, for example, information indicating a center of a lane, a boundary line (for example, a road partition line) of a lane, and the like. The second map information 150 may further include: road information; traffic restriction information; address information; facility information; telephone number information; and the like. The second map information 150 may be updated at any time. The second map information 150 may be updated based on, for example, the information acquired by some or all of the camera 11, the radar device 12, and the finder 13.

The automated-driving control device 100 is configured with the ADAS ECU 5. Each function of the automated-driving control device 100 is executed by the ADAS ECU 5. Each of the functional units of the automated-driving control device 100 is implemented by, for example, a central processing unit (CPU) executing a predetermined program (software). Some or all of the functional units of the automated-driving control device 100 may be implemented by hardware, such as a large-scale integration (LSI), an application-specific integrated circuit (ASIC), a field-programmable gate array (FPGA), and a graphics processing unit (GPU). For example, the high-precision position recognition unit 120 and the storage device storing the second map information 150 may be implemented by a map positioning unit (MPU). Some or all of the functional units included in the automated-driving control device 100 may be implemented by combination of software and hardware.

Next, the AD ECU 420 of the control server 400 will be described with reference to FIG. 2. As shown in FIG. 2, the AD ECU 420 includes the automated-driving control device 100A. The automated-driving control device 100A has a configuration and a function similar to those of the automated-driving control device 100 in the vehicle system 10 of the vehicle M. Each function of the automated-driving control device 100A is executed by the AD ECU 420. The AD ECU 420 is configured to derive the control contents of the automatic movement control performed by the vehicle M from the vehicle information (including the outside information) about the vehicle M transmitted from the vehicle M as described above and to transmit the derived control contents to the vehicle M.

For example, the AD ECU 420 is configured to determine, based on the position information about the vehicle M, whether the control contents of the vehicle M derived from the vehicle information about the vehicle M is appropriate. The AD ECU 420 is configured to select, based on whether the control contents is appropriate, the automatic movement control method of the vehicle M from, for example, the first automatic movement control, the second automatic movement control, and the manual movement control. The AD ECU 420 performs the selection by placing or lifting a restriction on some control methods.

Figure 3:
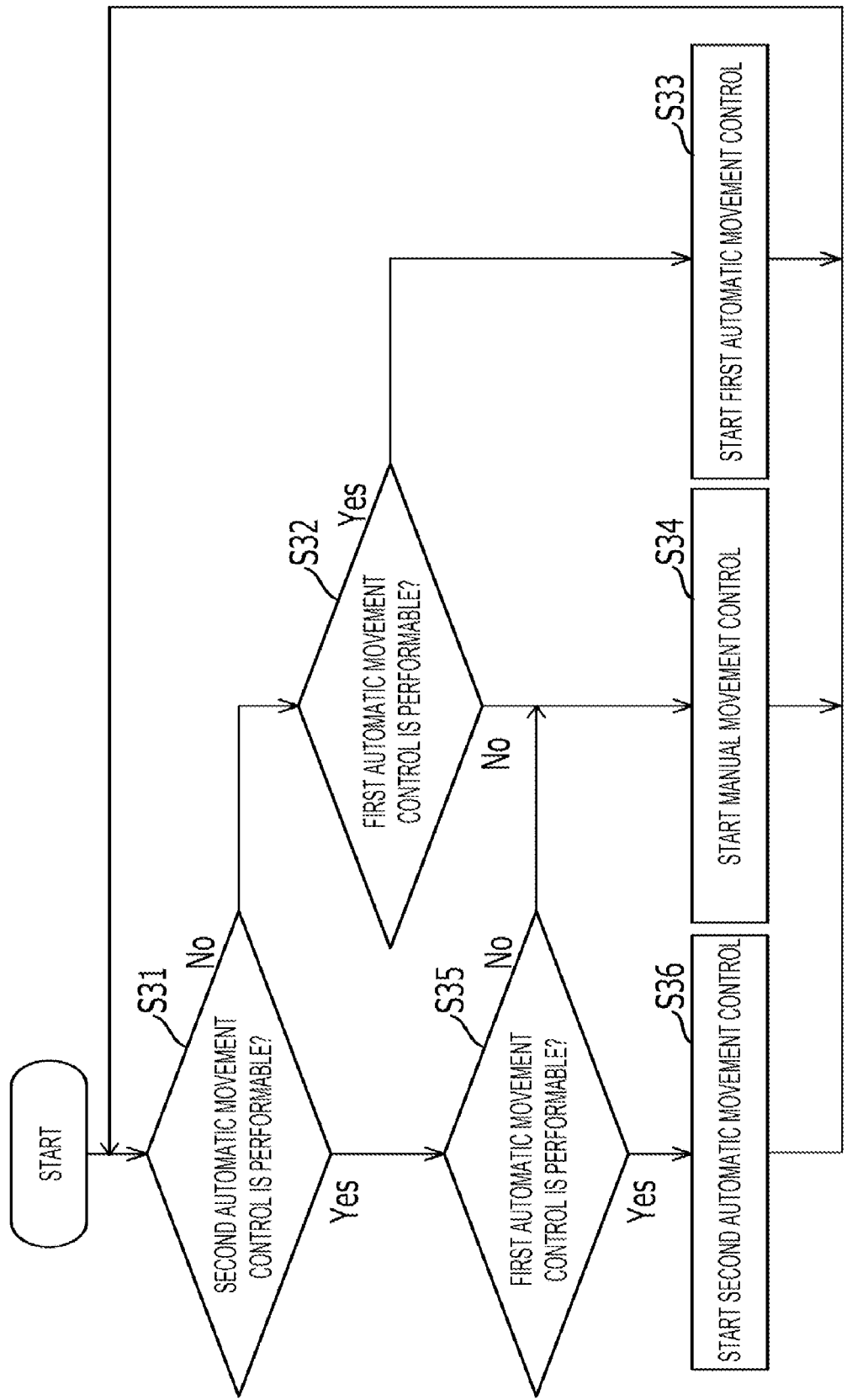
FIG. 3 is a flowchart of an example of movement control performed by the vehicle.
Figure 4:
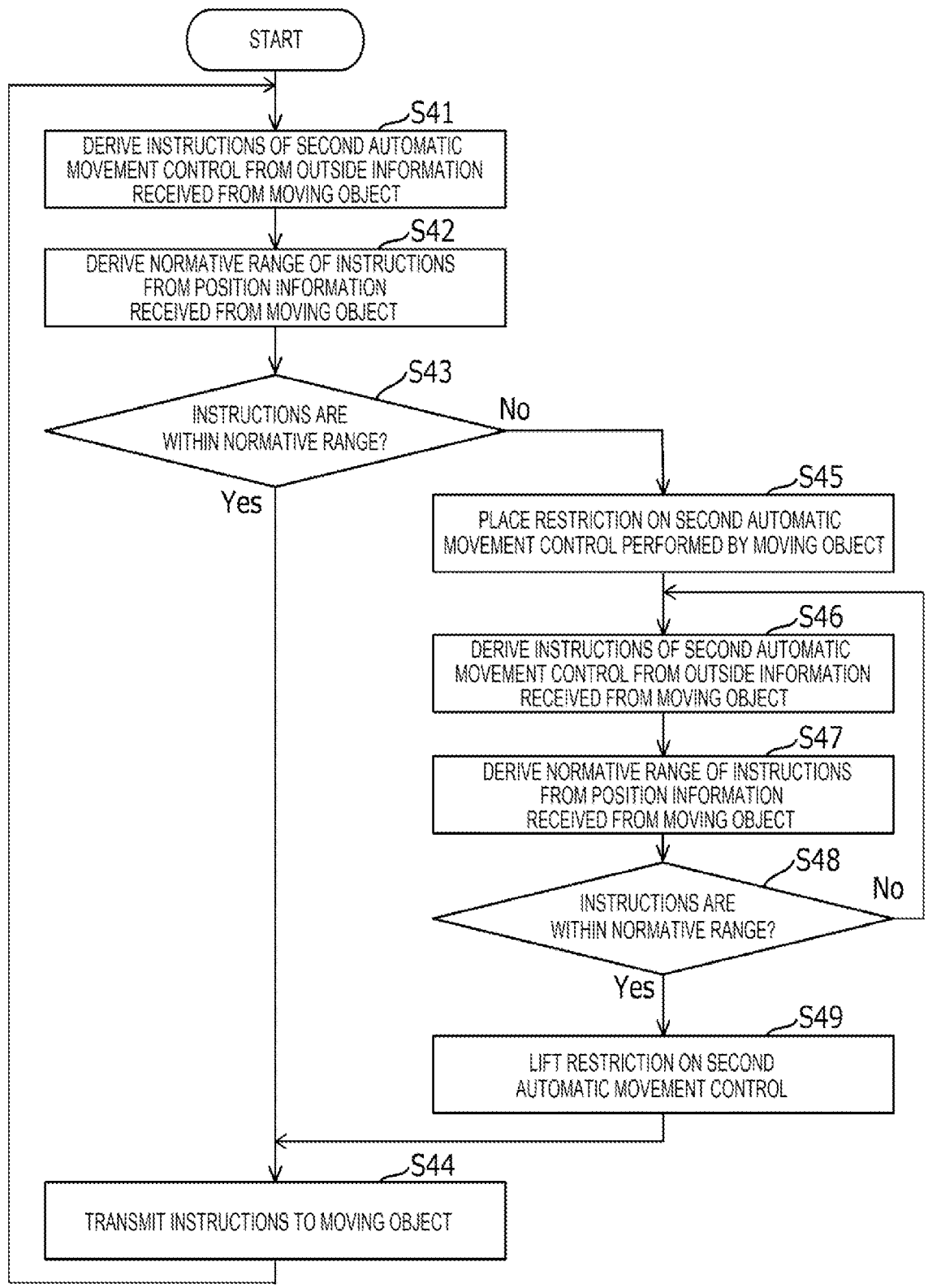
FIG. 4 is a flowchart of an example of movement control executed by a control server.

Next, a control example of the movement control in the movement control system 1 will be described with reference to FIGS. 3 and 4.

First, an example of the movement control performed by the vehicle M will be described with reference to FIG. 3.

When an ignition switch is pushed and an engine is started, the vehicle M determines whether the second automatic movement control can be performed in which the automatic movement of the vehicle M is performed based on the control by the control server 400 (step S31). The determination as to whether the second automatic movement control can be performed is made based on, for example, whether wireless communication can be properly performed between the vehicle M and the control server 400.

It is determined that communication cannot be performed properly and thus the second automatic movement control cannot be performed, for example, when there is a delay in the communication between the vehicle M and the control server 400. In addition, it is also determined that the communication cannot be performed properly and thus the second automatic movement control cannot be performed, for example, when the wireless communication can be performed between the vehicle M and the control server 400 but a failure occurs in the ADAS ECU 5 of the vehicle M or in a signal line between the ADAS ECU 5 and an actuator. The determination as to whether such a failure occurs is made in the vehicle M.

If it is determined in step S31 that the second automatic movement control cannot be performed (No in step S31), the vehicle M determines whether the first automatic movement control can be performed in which the automatic movement of the vehicle M is performed based on the control by the vehicle M itself (step S32). The determination as to whether the first automatic movement control can be performed is made based on whether the control by the ADAS ECU 5 of the vehicle M can be performed properly.

For example, if a failure occurs in the ADAS ECU 5 or in the signal line between the ADAS ECU 5 and the actuator, it is determined that the control cannot be performed properly and thus the first automatic movement control cannot be performed. The determination as to whether such a failure occurs is made in the vehicle M.

If it is determined in step S32 that the first automatic movement control can be performed (Yes in step S32), the vehicle M starts the automatic movement under the first automatic movement control (step S33). That is, if the vehicle M cannot perform the automatic movement under the second automatic movement control but can perform the automatic movement under the first automatic movement control, the vehicle M performs the automatic movement under the first automatic movement control. The vehicle M derives the control contents of the automatic movement by the vehicle M itself from the outside information about the vehicle M acquired by the sensor 2 and starts the automatic movement under the first automatic movement control based on the derived control contents. The vehicle M performs the automatic movement under the first automatic movement control and returns to step S31 to repeat the steps.

If it is determined in step S32 that the first automatic movement control cannot be performed (No in step S32), the vehicle M starts the movement under the manual movement control (step S34). That is, the vehicle M performs the movement under the manual movement control when both the automatic movement under the second automatic movement control and the automatic movement under the first automatic movement control cannot be performed. The vehicle M performs the movement under the manual movement control and returns to step S31 to repeat the steps.

If it is determined in step S31 that the second automatic movement control can be performed (Yes in step S31), the vehicle M determines whether the first automatic movement control can be performed in which the automatic movement of the vehicle M is performed based on the control by the vehicle M itself. The determination as to whether the first automatic movement control can be performed is made based on whether the control by the ADAS ECU 5 of the vehicle M can be performed properly as described above.

If it is determined in step S35 that the first automatic movement control cannot be performed (No in step S35), the vehicle M starts the movement under the manual movement control (step S34). That is, when the vehicle M cannot perform the automatic movement under the first automatic movement control but can perform the automatic movement under the second automatic movement control, the vehicle M performs the movement under the manual movement control but does not perform the automatic movement under the second automatic movement control. The vehicle M performs the movement under the manual movement control and returns to step S31 to repeat the steps.

If it is determined in step S35 that the first automatic movement control can be performed (Yes in step S35), the vehicle M starts the automatic movement under the second automatic movement control (step S36). That is, the vehicle M performs the automatic movement under the second automatic movement control when the vehicle M can perform both the automatic movement under the second automatic movement control and the automatic movement under the first automatic movement control. The vehicle M starts the automatic movement under the second automatic movement control based on the control contents of the automatic movement derived by the control server 400 from the outside information about the vehicle M transmitted from the vehicle M. The vehicle M performs the automatic movement under the second automatic movement control and returns to step S31 to repeat the steps.

Next, an example of the movement control executed by the control server 400 will be described with reference to FIG. 4.

For example, it is assumed that the vehicle M is performing the automatic movement under the second automatic movement control, when the vehicle M can perform the automatic movement under the first automatic movement control as described above with reference to FIG. 3.

The control server 400 receives the vehicle information (including the outside information, the position information, the route information, the operation information, and the like) about the vehicle M from the vehicle M via the base station 300.

The control server 400 derives the control contents (for example, instructions for the vehicle M) of the second automatic movement control from the outside information about the vehicle M received from the vehicle M (step S41).

The instructions for the vehicle M derived from the outside information includes, for example, "speed instructions" specifying a speed of the vehicle M. In this case, the control server 400 receives from the vehicle M, for example, the outside information indicating that the vehicle M is going straight and derives, from the outside information, speed instructions to maintain a speed of the vehicle M at a current value of 50 km/h.

In addition, the instructions for the vehicle M derived from the outside information includes, for example, "acceleration instructions" specifying acceleration of the vehicle M. In this case, the control server 400 receives from the vehicle M, for example, the outside information indicating that the vehicle M is going down a slope on an expressway and derives, from the outside information, the acceleration instructions to reduce the acceleration (throttle back) of the vehicle M.

Next, the control server 400 derives a normative range of the instructions for the vehicle M corresponding to the location (section) of the vehicle M from the position information of the vehicle M received from the vehicle M (step S42).

The normative range of the instructions derived from the position information includes, for example, road conditions (for example, a straightaway, a curve, an uphill, a downhill, or a flat) of the section in which the vehicle M is, a legally permitted speed of the road, a normative value derived from the road conditions and the legally permitted speed, and the like.

Next, the control server 400 determines whether the instructions for the vehicle M derived in step S41 are within the normative range derived in step S42 (step S43).

If it is determined in step S43 that the instructions are within the normative range (Yes in step S43), the control server 400 transmits the derived instructions for the vehicle M to the vehicle M via the base station 300 (step S44). The vehicle M performs the automatic movement under the second automatic movement control according to the instructions (control contents) transmitted from the control server 400. The control server 400 returns to step S41 to repeat the steps after the control server 400 transmits the instructions to the vehicle M.

If it is determined in step S43 that the instructions are out of the normative range (No in step S43), the control server 400 places a restriction on the automatic movement of the vehicle M under the second automatic movement control (step S45). Specifically, the control server 400 transmits, to the vehicle M, a control signal for causing the vehicle M to shift to the automatic movement under the first automatic movement control.

For example, it is assumed that the vehicle M is on a largely curved road but the control server 400 receives the outside information indicating, "the vehicle M is on a straight road" from the vehicle M and derives, from the outside information, the speed instructions to "maintain a speed at the current value of 50 km/h." Contrary to the face that the vehicle M is actually on the largely curved road, the control server 400 determines that the vehicle M is on the straight road because a transmission delay in the wireless communication between the vehicle M and the control sever 400 may prevent appropriate (real-time) reception of the outside information. On the other hand, the control server 400 can derive, from the position information received from the vehicle M, a normative value and the like to "reduce a speed of the vehicle M under 30 km/h since the vehicle M is on a largely curved road," which corresponds to corresponding to actual conditions of the vehicle M.

Since the transmission delay in the wireless communication can arise and the outdated outside information and the latest position information can be transmitted simultaneously to the control server 400, the instructions for the vehicle M derived from the outside information may deviate from the normative range of the instructions corresponding to the section of the vehicle M derived from the position information.

Next, similarly to step S41 described above, the control server 400 derives the control contents (for example, the instructions for the vehicle M) of the second automatic movement control from the outside information of the vehicle M received from the vehicle M (step S46).

Next, similarly to step S42 described above, the control server 400 derives the normative range of the instructions for the vehicle M corresponding to the location (section) of the vehicle M from the position information of the vehicle M received from the vehicle M (step S47).

Next, the control server 400 determines whether the instructions for the vehicle M derived in step S46 are within the normative range derived in step S47 (step S48). If it is determined that the instructions are out of the normative range (No in step S48), the control server 400 returns to step S46 to repeat the steps.

If it is determined in step S48 that the instructions are out of the normative range (Yes in step S48), the control server 400 lifts the restriction on the automatic movement of the vehicle M under the second automatic movement control that is placed in step S45 (step S49). Specifically, the control server 400 transmits, to the vehicle M, a control signal for causing the vehicle M to shift to the automatic movement under the second automatic movement control. That is, after the control server 400 places a restriction on the automatic movement of the vehicle M under the second automatic movement control, the control server 400 compares the instructions for the vehicle M that is based on the outside information with the normative range of the instructions for the vehicle M that is based on the position information, and, if the instructions are within the normative range, the control server 400 controls the vehicle M to resume the automatic movement under the second automatic movement control.

Next, the control server 400 proceeds to step S44 to transmit the instructions for the vehicle M derived in step S46 to the vehicle M via the base station 300. After the control server 400 transmits the instructions to the vehicle M, the control server 400 returns to step S41 to repeat the steps. Based on the control signal from the control server 400, the vehicle M changes the automatic movement of the vehicle M from the automatic movement under the first automatic movement control to the automatic movement under the second automatic movement control.

As described above, according to the movement control system 1, when both the first automatic movement control in which the automatic movement is performed based on the control by the vehicle M itself and the second automatic movement control in which the automatic movement is performed based on the control of the control server 400 can be performed, the second automatic movement control is performed. When the first automatic movement control cannot be performed but the second automatic movement control can be performed, the second automatic movement control is not performed. Therefore, it is possible to prevent abrupt interruption of the automatic movement control when a failure occurs in the communication between the control server 400 and the vehicle M, thereby improving safety of the vehicle M configured to perform the automatic movement.

According to the movement control system 1, when the instructions (control contents) for the vehicle M derived from the outside information deviates from the normative range of the instructions in the section in which the vehicle M is moving during the automatic movement under the second automatic movement control, it is possible to place a restriction on the automatic movement of the vehicle M under the second automatic movement control to shift to the automatic movement under the first automatic movement control. Therefore, it is possible to suppress an inappropriate second automatic movement control on the vehicle M due to a transmission delay of the outside information from the vehicle M to the control server 400, thereby improving the safety of the vehicle M.

According to the movement control system 1, even when the automatic movement under the second automatic movement control is restricted due to the transmission delay of the outside information from the vehicle M to the control server 400, the automatic movement under the second automatic movement control can be resumed after the transmission delay is eliminated. Therefore, it is possible to prolong a period in which the advanced automatic movement control having a high degree of automation in the vehicle M by the control led by the control server 400 is performed.

According to the movement control system 1, the number of tasks required for the driver of the vehicle M in the second automatic movement control in which the control contents of the vehicle M is derived by the control server 400 is smaller than that of the first automatic movement control in which the control contents of the vehicle M is derived by the vehicle M itself. Therefore, the second automatic movement control in which the number of tasks of the driver is small, that is, computational complexity is high can be processed by the ECU of the control server 400, thereby reducing a computational load on the ECU of the vehicle M.

Although the embodiment of the present disclosure has been described above, the present invention is not limited to the above embodiment. Modifications, improvements, and the like can be made as appropriate.

Although the moving object is the vehicle in the above embodiment, the present invention is not limited thereto. The concept of the present disclosure can be applied not only to a vehicle but also to a robot, a ship, an aircraft, and the like that are provided with a drive source and are movable by power of the drive source.

At least the following are described in the present disclosure. Although corresponding components or the like in the above embodiment are shown in parentheses, the present invention is not limited thereto.

(1) A movement control system including:

a server (control server 400); and a moving object (vehicle M) configured to perform first automatic movement control in which control contents are determined based on outside information and second automatic movement control in which the control contents are given by the server receiving the outside information, in which the moving object performs the second automatic movement control in a case where both the first automatic movement control and the second automatic movement control are performable, and the moving object does not perform the second automatic movement control in a case where the second automatic movement control is performable but the first automatic movement control is unperformable.

According to (1), when the first automatic movement control is unperformable and the second automatic movement control is performable, the second automatic movement control is not performed. Thus, it is possible to prevent abrupt interruption of the automatic movement control when a failure occurs in communication between the server and the moving object, thereby improving safety of the moving object.

(2) The movement control system according to (1), in which the server places restriction on the second automatic movement control performed by the moving object in a case where the control contents derived from the outside information deviates from a normative range corresponding to a section in which the moving object is during the second automatic movement control.

According to (2), it is possible to prevent inappropriate second automatic movement control due to a transmission delay of the outside information from the moving object to the server, thereby improving the safety.

(3) The movement control system according to (2), in which the server receives the outside information from the moving object and derives the control contents from the outside information after the server places the restriction on the second automatic movement control, and the server lifts the restriction on the second automatic movement control in a case where the derived control contents are within the normative range.

According to (3), when the transmission delay of the outside information from the moving object to the server is eliminated, the second automatic movement control is resumed, thereby prolonging a period in which the server-led advanced automatic movement control is executed.

(4) The movement control system according to any one of (1) to (3), in which the number of tasks of a user of the moving object in the second automatic movement control is smaller than in the first automatic movement control.

According to (4), the server executes the second automatic movement control in which the number of the user's tasks is small, that is, computational complexity is high, thereby reducing a processing load on the moving object.

(5) A moving object configured to perform automatic movement control, the moving object including:

a communication unit (communication unit 3) configured to communicate with a server;

an acquisition unit (sensor 2) configured to acquire outside information about the moving object; and a control unit (ADAS ECU 5) configured to execute first automatic movement control in which control contents are determined based on the outside information and second automatic movement control in which the control contents are given by the server receiving the outside information from the communication unit, in which the control unit executes the second automatic movement control in a case where both the first automatic movement control and the second automatic movement control are performable, and the control unit does not execute the second automatic movement control in a case where the second automatic movement control is performable but the first automatic movement control is unperformable.

According to (5), when the first automatic movement control is inexecutable and the second automatic movement control is executable, the second automatic movement control is not executed. Thus, it is possible to prevent abrupt interruption of the automatic movement control when a failure occurs in the communication between the server and the moving object, thereby improving safety of the moving object.

(6) A control method for a moving object configured to perform first automatic movement control in which control contents are determined based on outside information and second automatic movement control in which the control contents are given by a server receiving the outside information, the control method including:

executing the second automatic movement control in a case where both the first automatic movement control and the second automatic movement control are executable; and not executing the second automatic movement control in a case where the second automatic movement control is executable but the first automatic movement control is inexecutable.

According to (6), when the first automatic movement control is executable and the second automatic movement control is inexecutable, the second automatic movement control is not executed. Thus, it is possible to prevent abrupt interruption of the automatic movement control when a failure occurs in the communication between the server and the moving object, thereby improving safety of the moving object.

What is claimed is:

1. A movement control system comprising:
   a server configured to communicate with a moving object to receive and transmit information, the server being not included in the moving object; and
   the moving object configured to perform first automatic movement control in which control contents are determined by the moving object based on outside information and second automatic movement control in which the moving object transmits the outside information to the server and the server generates control contents of the second automatic movement control, the server transmitting the control contents of the second automatic movement control to the moving object, wherein
   the moving object performs the second automatic movement control based on both the first automatic movement control and the second automatic movement control being performable,
   the server places restriction on the second automatic movement control performed by the moving object in a case where the control contents derived from the outside information deviates from a normative range corresponding to a section in which the moving object is during the second automatic movement control,
   the server receives the outside information from the moving object and derives the control contents from the outside information after the server places the restriction on the second automatic movement control, and
   the server lifts the restriction on the second automatic movement control in a case where the derived control contents are within the normative range.

2. The movement control system according to claim 1, wherein
   a number of tasks of a user of the moving object in the second automatic movement control is smaller than in the first automatic movement control.

3. A moving object configured to perform automatic movement control, the moving object comprising:
   a communication unit configured to communicate with a server to receive and transmit information, the server being not included in the moving object;
   an acquisition unit configured to acquire outside information about the moving object; and
   a control unit configured to execute first automatic movement control in which control contents are determined by the moving object based on the outside information and second automatic movement control in which the moving object transmits the outside information to the server and the server generates control contents of the second automatic movement control, the server transmitting the control contents of the second automatic movement control to the moving object, wherein
   the control unit executes the second automatic movement control based on both the first automatic movement control and the second automatic movement control being performable,
   the server places restriction on the second automatic movement control performed by the moving object in a case where the control contents derived from the outside information deviates from a normative range corresponding to a section in which the moving object is during the second automatic movement control,
   the server receives the outside information from the moving object and derives the control contents from the outside information after the server places the restriction on the second automatic movement control,
   the server lifts the restriction on the second automatic movement control in a case where the derived control contents are within the normative range, and
   the communication unit, the acquisition unit, and the control unit are each implemented via at least one processor.

4. A control method for a moving object configured to perform first automatic movement control in which control contents are determined by the moving object based on outside information and second automatic movement control in which the moving object transmits the outside information to a server and the server generates control contents of the second automatic movement control, the server transmitting the control contents of the second automatic movement control to the moving object, the control method comprising:
   executing the second automatic movement control based on both the first automatic movement control and the second automatic movement control being performable, wherein the moving object communicates with the server to receive and transmit information, the server being not included in the moving object, the server places restriction on the second automatic movement control performed by the moving object in a case where the control contents derived from the outside information deviates from a normative range corresponding to a section in which the moving object is during the second automatic movement control, the server receives the outside information from the moving object and derives the control contents from the outside information after the server places the restriction on the second automatic movement control, and the server lifts the restriction on the second automatic movement control in a case where the derived control contents are within the normative range.

\* \* \* \* \*